(12) United States Patent
Huang et al.

(10) Patent No.: US 11,362,710 B2
(45) Date of Patent: Jun. 14, 2022

(54) CODEBOOK FEEDBACK METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Yingpei Huang, Guangdong (CN); Wenhong Chen, Guangdong (CN); Zhihua Shi, Guangdong (CN); Yun Fang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/370,830

(22) Filed: Jul. 8, 2021

(65) Prior Publication Data
US 2021/0336669 A1    Oct. 28, 2021

Related U.S. Application Data

(63) Continuation of application No. PCT/CN2019/076209, filed on Feb. 26, 2019.

(51) Int. Cl.
*H04B 7/0456* (2017.01)
*H04L 27/26* (2006.01)

(52) U.S. Cl.
CPC ....... *H04B 7/0482* (2013.01); *H04L 27/2636* (2013.01); *H04L 27/2607* (2013.01)

(58) Field of Classification Search
CPC . H04B 7/0482; H04B 7/0456; H04L 27/2607; H04L 27/2636
(Continued)

(56) References Cited

U.S. PATENT DOCUMENTS

| | | | |
|---|---|---|---|
| 10,560,170 B2* | 2/2020 | Wu | H04B 7/0639 |
| 2021/0143885 A1* | 5/2021 | Gro Mann | H04B 7/0632 |
| 2021/0226674 A1* | 7/2021 | Ramireddy | H04B 7/0486 |

FOREIGN PATENT DOCUMENTS

| | | |
|---|---|---|
| CN | 108288987 A | 7/2018 |
| CN | 109314559 A | 2/2019 |

(Continued)

OTHER PUBLICATIONS

International Search Report dated Nov. 29, 2019 of PCT/CN2019/076209 (4 pages).
Catt "Discussions on Type II CSI enhancement" R1-1902018; 3GPP TSG RAN WG1 Meeting #96; Athens, Greece; Feb. 25-Mar. 1, 2019. 16 pages.
Extended European Search Report for European Application No. 19917114.1 dated Mar. 4, 2022. 8 pages.
(Continued)

*Primary Examiner* — Leila Malek
(74) *Attorney, Agent, or Firm* — Perkins Coie LLP

(57) ABSTRACT

The present disclosure discloses a codebook feedback method, a terminal device and a network device. The codebook feedback method, comprising: selecting, by a terminal device, M frequency domain Discrete Fourier Transform (DFT) vectors from a DFT array; determining, by the terminal device, a first frequency domain DFT vector indication set from a plurality of frequency domain DFT vector indication sets according to the M frequency domain DFT vectors, wherein an indication of the M frequency domain DFT vectors is equivalent to a first frequency domain DFT vector indication in the first frequency domain DFT vector indication set, and M is a positive integer; and sending, by the terminal device, an indication message to the network device, wherein the indication message is used for indicating the first frequency domain DFT vector indication set.

24 Claims, 7 Drawing Sheets

(58) Field of Classification Search
USPC .......................................................... 375/267
See application file for complete search history.

(56) References Cited

FOREIGN PATENT DOCUMENTS

| | | |
|---|---|---|
| CN | 109314563 A | 2/2019 |
| EP | 2228955 A1 | 9/2010 |
| KR | 20030059569 A | 7/2003 |
| WO | 2012002767 A2 | 1/2012 |

OTHER PUBLICATIONS

First Office Action for Chinese Application No. 202110733373 dated Jan. 13, 2022. 12 pages with English translation.
LG Electronics "Discussions on overhead reduction for Type II codebook" R1-1813916; 3GPP TSG RAN WG1 Meeting #95; Spokane, USA; Nov. 12-16, 2018. 8 pages.
Motorola Mobility/Lenovo "Type II CSI overhead reduction" R1-1813357; 3GPP TSG RAN 1 #95; Nov. 12-16, 2018. 9 pages.
Nokia et al. "Feedback transmission of type II codebook" R1-1711590; 3GPP TSG RAN WG1 NR Ad-Hoc #2; Qingdao, P.R. China; Jun. 27-30, 2017. 6 pages.
Examination Report No. 1 for Australian Application No. 2019431484 dated Apr. 4, 2022. 4 pages.

\* cited by examiner

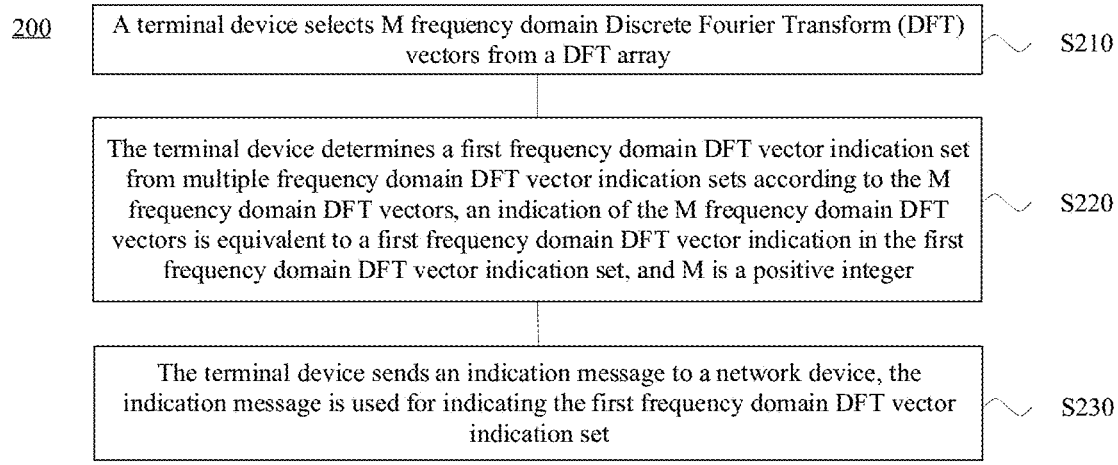
FIG. 4
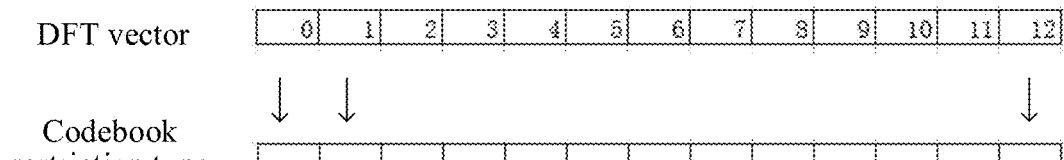
FIG. 5
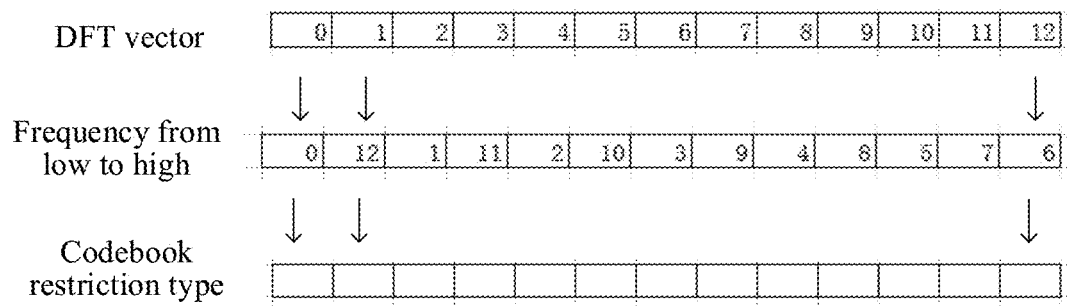
FIG. 6
FIG. 7

FIG. 10

| 400 | A network device receives indication message sent by a terminal device, the indication message is used for indicating a first frequency domain Discrete Fourier Transform (DFT) vector indication set in multiple frequency domain DFT vector indication sets | ∽ S410 |
|---|---|---|

| The network device recovers a downlink channel according to any one frequency domain DFT vector indication equivalent to a first frequency domain DFT vector indication in the first frequency domain DFT vector indication set | ∽ S420 |
|---|---|

FIG. 11

CODEBOOK FEEDBACK METHOD, TERMINAL DEVICE, AND NETWORK DEVICE

CROSS-REFERENCE TO RELATED APPLICATION

This application is a continuation application of International Application No. PCT/CN2019/076209 filed on Feb. 26, 2019, of which the entire disclosure is hereby incorporated by reference.

TECHNICAL FIELD

Implementations of the present disclosure relate to the field of communication, and particularly to a codebook feedback method, a terminal device, and a network device.

BACKGROUND

In R16, a New Radio (NR) type II codebook may be expressed as $W=W_1 \hat{W}_2 W_f^H$, in which $W_1$ indicates 2L spatial beams, $W_f^H$ is used for indicating M frequency domain DFT vectors, and $\hat{W}_2$ (2L*M) indicates a weighting coefficient of a frequency domain DFT vector pair of arbitrary spatial beam.

Content of Channel State Information (CSI) reported by a terminal device to a network device includes L beams of $W_1$, M frequency domain DFT vectors indicated by $W_f^H$, and quantized $\hat{W}_2$. Reporting of $\hat{W}_2$ includes the Reporting of M frequency domain DFT vectors.

At present, the terminal device indicates positions of M frequency domain DFT vectors by means of $\lceil \log 2(\text{nchoosek}(N3,M)) \rceil$, in which N3 indicates a number of columns of $W_f^H$. When N3 is large, there is a signaling overhead problem for reporting of M frequency domain DFT vectors.

SUMMARY

Implementations of the present disclosure provide a codebook feedback method, a terminal device and a network device.

In a first aspect, a codebook feedback method is provided, which includes: selecting, by a terminal device, M frequency domain Discrete Fourier Transform (DFT) vectors from a DFT array; determining, by the terminal device, a first frequency domain DFT vector indication set from multiple frequency domain DFT vector indication sets according to the M frequency domain DFT vectors, wherein an indication of the M frequency domain DFT vectors is equivalent to a first frequency domain DFT vector indication in the first frequency domain DFT vector indication set, and M is a positive integer; and sending, by the terminal device, an indication message to the network device, wherein the indication message is used for indicating the first frequency domain DFT vector indication set.

In a second aspect, a codebook feedback method is provided, which includes: sending, by a terminal device, an indication message to a network device, wherein the indication message is used for indicating a position in a particular frequency domain Discrete Fourier Transform (DFT) vector in a DFT array corresponding to a strongest coefficient of a weighting coefficient array of a space-frequency domain of a codebook.

In a third aspect, a codebook feedback method is provided, which includes: receiving, by a network device, an indication message sent by a terminal device, wherein the indication message is used for indicating a first frequency domain Discrete Fourier Transform (DFT) vector indication set in multiple frequency domain DFT vector indication sets; and recovering, by the network device, a downlink channel according to any one frequency domain DFT vector indication equivalent to a first frequency domain DFT vector indication in the first frequency domain DFT vector indication set.

In a fourth aspect, a codebook feedback method is provided, which includes: receiving, by a network device, an indication message sent by a terminal device, wherein the indication message is used for indicating a position in a particular frequency domain Discrete Fourier Transform (DFT) vector in a DFT array corresponding to a strongest coefficient of a weighting coefficient array in a space-frequency domain of a codebook.

In a fifth aspect, a terminal device is provided, which is configured to perform the method in the first aspect described above or various implementations thereof.

Specifically, the terminal device includes function modules used for performing the method in the first aspect described above or various implementations thereof.

In a sixth aspect, a terminal device is provided, which is configured to perform the method in the second aspect or various implementations thereof.

Specifically, the terminal device includes function modules for performing the method in the above second aspect or various implementations thereof.

In a seventh aspect, a network device is provided, which is configured to perform the method in the third aspect described above or various implementations thereof.

Specifically, the network device includes function modules used for performing the method in the third aspect described above or various implementations thereof.

In an eighth aspect, a network device is provided, which is configured to perform the method in the fourth aspect described above or various implementations thereof.

Specifically, the network device includes function modules used for performing the method in the fourth aspect described above and various implementations thereof.

In a ninth aspect, a network device is provided, which includes a processor and a memory. The memory is configured to store a computer program, and the processor is configured to call and run the computer program stored in the memory to perform the method in the first aspect to the second aspect described above or various implementation modes thereof.

In a tenth aspect, a network device is provided, which includes a processor and a memory. The memory is configured to store a computer program, and the processor is configured to call and run the computer program stored in the memory to perform the method in the third aspect to the fourth aspect described above and various implementations thereof.

In an eleventh aspect, a chip is provided, which is configured to implement the method in any one of the first aspect to the fourth aspect or various implementations thereof.

Specifically, the chip includes a processor configured to call and run a computer program from a memory, enabling a device in which the chip is installed to perform the method in any one of the first aspect to the fourth aspect or various implementations thereof.

In a twelfth aspect, a computer-readable storage medium is provided, which is configured to store a computer program, wherein when the computer program is run on a computer, the computer is enabled to perform the method in any one of the first aspect to the fourth aspect or various implementations thereof.

In a thirteenth aspect, a computer program product is provided, which includes computer program instructions, when the computer program instructions are executed by a computer, the computer is enabled to perform the method in any one of the first aspect to the fourth aspect or various implementations thereof.

In a fourteenth aspect, a computer program is provided. when the computer program is run on a computer, the computer is enabled to perform the method in any one of the above first aspect to the second aspect or various implementations thereof.

BRIEF DESCRIPTION OF DRAWINGS

FIG. 4 is a schematic diagram of a codebook feedback method according to an implementation of the present disclosure.

FIG. 5 shows another schematic diagram for indicating selected M frequency domain DFT vectors.

FIG. 6 shows a mapping diagram between DFT vectors and codebook restriction types.

FIG. 7 shows a mapping diagram among DFT vectors, frequencies and codebook restriction types.

FIG. 10 is another schematic diagram of a DFT vector position corresponding to a strongest coefficient according to an implementation of the present disclosure.

FIG. 11 is another schematic diagram of a codebook feedback method according to an implementation of the present disclosure.

DETAILED DESCRIPTION

Technical solutions in implementations of the present disclosure will be described below with reference to drawings in the implementations of the present disclosure. It is apparent that the implementations described are just some of the implementations of the present disclosure, but not all of the implementations of the present disclosure. Based on the implementations of the present disclosure, all other implementations achieved by a person of ordinary skill in the art without paying inventive efforts are within the protection scope of the present disclosure.

It should be understood that the technical solutions of the implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, a New Radio (NR) or future 5G System.

In particular, the technical solutions of the implementations of the present disclosure can be applied to various communication systems based on non-orthogonal multiple access technologies, such as a Sparse Code Multiple Access (SCMA) system, and a Low Density Signature (LDS) system, etc. Of course, the SCMA system and the LDS system may also be referred to as other names in the communication field. Further, the technical solutions of the implementations of the present disclosure can be applied to a multicarrier transmission system employing non-orthogonal multiple access technology, such as an Orthogonal Frequency Division Multiplexing (OFDM) system based on the non-orthogonal multiple access technology, a Filter Bank Multi-Carrier (FBMC) system, a Generalized Frequency Division Multiplexing (GFDM) system, and a Filtered OFDM (F-OFDM) system, etc.

Figures 1, 2:
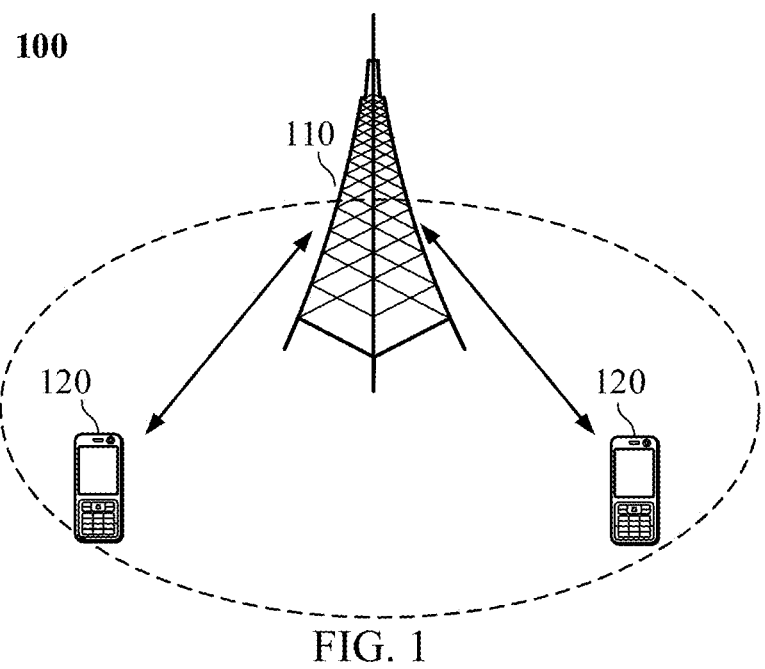
FIG. 1 is a schematic diagram of an architecture of a communication system according to an implementation of the present disclosure.
FIG. 2 shows a schematic diagram for indicating selected M frequency domain DFT vectors.

Illustratively, a communication system 100 to which an implementation of the present disclosure is applied is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network device gNB in a 5G network, or a network device in a future evolved Public Land Mobile Network (PLMN), etc.

The wireless communication system 100 further includes at least one terminal 120 located within the coverage range of the network device 110. The terminal device may be a User Equipment (UE), an access terminal, a user unit, a user station, a mobile site, a mobile station, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device with a wireless communication function, a computing device or other processing device connected to a wireless modem, an on-board device, a wearable device, a terminal device in a future 5G network, or a terminal device in a future evolved Public Land Mobile Network (PLMN), etc., which is not restricted in implementations of the present invention.

Optionally, a device to device (D2D) communication may be performed between the terminal devices 120.

Optionally, the 5G system or 5G network may be referred to as a New Radio (NR) system or a NR network.

FIG. 1 exemplarily illustrates one network device and two terminal devices. Optionally, the communication system 100 may include multiple network devices, and other numbers of terminal devices may be included within the coverage range of each network device, which are not limited in the implementations of the present disclosure.

Optionally, the communication system 100 may include other network entities, such as a network controller and a mobile management entity, which are not limited in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, and will not be described repeatedly herein. The communication device may also include other devices in the communication system 100, such as network controllers and mobile management entities and other network entities, which are not limited in the implementations of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

For each layer codebook of a multi-layer codebook, an NR type II codebook is encoded independently in a frequency domain (each subband). Because spatial quantization accuracy is high, a total feedback amount is too large. By feeding back a frequency domain-space joint codebook, the feedback amount may be greatly reduced under a condition of ensuring NR performance. Particularly, an R16 NR type II codebook may be expressed as a following formula (1):

$$W = W_1 \hat{W}_2 W_f^H \quad (1)$$

Herein, $W_1$ may be used for indicating 2L spatial beams; $W_f^H$ may be used for indicating a Discrete Fourier Transformation (DFT) base vector of M frequency domains; $\hat{W}_2$ (a matrix of 2L*M) may indicates a weighting coefficient of a frequency domain DFT vector pair of arbitrary spatial beam.

Content of Channel state information (CSI) reported by the UE may include L beams indicated by $W_1$, M DFT base vectors indicated by $W_f^H$ and quantized $\hat{W}_2$. A base station obtains downlink CSI of each layer through a product of the three.

Main parameters involved in reporting of $W_1$, $W_f^H$ and $\hat{W}_2$ may include: L value, i.e. a number of space basis DFT vectors; M value (related to a reported frequency domain bandwidth), i.e. a number of reported frequency basis DFT vectors; K0 value, which is used for constraining a maximum number of elements reported by $\hat{W}_2$. A number and/or position of non-zero elements in $\hat{W}_2$ is determined through a bitmap and/or an indication. Quantization accuracy in $\hat{W}_2$ is determined by one or more groups of parameters (amplitude and phase). For example, the amplitude may be quantized by 3/4 bit, and the phase may also be quantized by 3/4 bit. For example, for the part of elements with large energy (such as first 50%), the amplitude is quantized by 4 bits and the phase is quantized by 3 bits. For the part of elements with small energy, the amplitude may be quantized with 2 bits and the phase may be quantized with 2 bits. Or, for a weighting coefficient corresponding to a 0th frequency basis, both the amplitude and phase are quantized with 4 bits. While for weighting coefficients corresponding to other frequency bases, both the amplitude and phase are quantized with 3 bits.

Herein, M value is a number of columns of $\hat{W}_2$. M frequency bases are selected by the UE from DFT vectors of N3 columns. For example, as shown in FIG. 2, [0 4 9] is selected from 13 columns.

A cyclic shift of Inverse Discrete Fourier Transform (IDFT)/DFT: performing DFT on a sequence after cyclic shifting is equal to performing DFT on the non-shifted sequence and then multiplying by a linear phase.

If $X_k = DFT(\{x\}_n)_k$

X is cyclic shifted d, the DFT result is $$X_k \exp\left(-\frac{2\pi}{N}kd\right) = DFT(\{x_{mod(n-d,N)}\})_k$$

That is, the DFT result only is multiplying the frequency domain by the linear phase, and the amplitude is unchanged.

If the same cyclic shift is used for each row of W2 (a Type II codebook is selected by column), a phase is multiplied when a channel is recovered at the base station end, but there is no effect to a MIMO channel.

Under this condition, it may be considered that two codewords are equivalent when M columns selected by the two codewords belong to a cyclic shift relationship.

Figure 3:
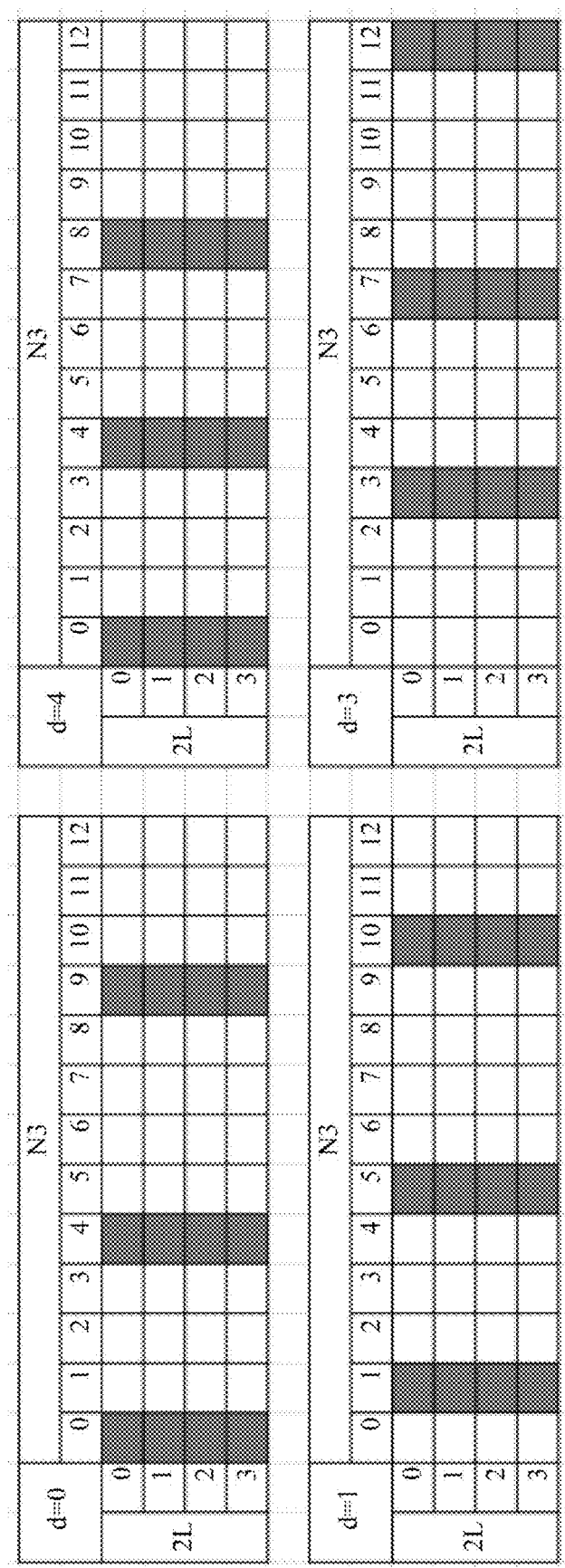
FIG. 3 shows a schematic diagram of M frequency domain DFT vectors that are cyclically shifted.

As shown in FIG. 3, when the cyclic shift (right shift) d=0/1/3/4, if a codeword is $X_k$ for d=0, then the rest codewords are $$X_k \exp\left(-\frac{2\pi}{N}kd\right)$$

(k is a subscript of frequency domain). The four shifts may be considered as a same codeword.

Number of shift register Cycle: for a binary sequence with a length n, there are a 1 and n−a 0. When two sequences belong to a cyclic shift, the two sequences are considered to be equivalent, and may be divided into $$\frac{1}{n} \sum_{d|gcd(a,n-a)} \varphi(d) \binom{n/d}{a/d}$$

groups of sequences in total.

Herein, a factor d of gcd (a, n−a) is times of repetitions of subsequences appeared, and d|n indicates that d is a factor of n; gcd is to find a greatest common divisor, φ is Euler function, and ( ) indicates to find combinatorial number. Particularly, when n and a are coprime, $$\frac{1}{n} \sum_{d | \gcd(a, n-a)} \varphi(d) \binom{n/d}{a/d} = \binom{n}{a} / n.$$

That is, there are n different sequences that satisfy cyclic shifting in each set.

FIG. 4 shows a schematic diagram of a codebook feedback method 200 according to an implementation of the present disclosure. As shown in FIG. 4, the method 200 may be executed by a terminal device, and the method 200 includes some or all of the following contents:

S210, the terminal device selects M frequency domain Discrete Fourier Transform (DFT) vectors from a DFT array;

S220, the terminal device determines a first frequency domain DFT vector indication set from multiple frequency domain DFT vector indication sets according to the M frequency domain DFT vectors, wherein an indication of the M frequency domain DFT vectors is equivalent to a first frequency domain DFT vector indication in the first frequency domain DFT vector indication set, and M is a positive integer; and S230, the terminal device sends an indication message to a network device, wherein the indication message is used for indicating the first frequency domain DFT vector indication set.

Optionally, a sequence corresponding to the indication of the M frequency domain DFT vectors is different from a sequence corresponding to the first frequency domain DFT vector indication, and the sequence corresponding to the indication of the M frequency domain DFT vectors has a cyclic shift relationship with the sequence corresponding to the first frequency domain DFT vector indication; or The first frequency domain DFT vector indication set includes multiple frequency domain DFT vector indication, wherein sequences corresponding to any two frequency domain DFT vector indications in the multiple frequency domain DFT vector indications have a cyclic shift relationship, and the first frequency domain DFT vector indication set comprises the indication of the M frequency domain DFT vectors.

Optionally, frequency domain DFT vector indications in any two frequency domain DFT vector indication sets of the multiple frequency domain DFT vector indication sets are not equivalent, and a number of the multiple frequency domain DFT vector indication sets is determined by $$\frac{1}{N3} \sum_{d || \gcd(M, N3-M)} \varphi(d) \binom{N3/d}{M/d},$$

herein N3 is a number of columns of the DFT array, gcd (M, N3−M) is a common divisor of M and (N3−M), φ is Euler function, ( ) is a combinatorial number function, Σ is a sum function, and d is a factor of a maximum common divisor of M and (N3−M).

Optionally, a sequence value of the sequence corresponding to the first frequency domain DFT vector indication is a minimum value or a maximum value of sequences corresponding to N3 frequency domain DFT vector indications of N3 cyclic shifting operations performed on a sequence corresponding to the indication of the M frequency domain DFT vectors, wherein N3 is the number of columns of the DFT array.

Optionally, the method further includes: determining the indication message according to the sequence corresponding to the first frequency domain DFT vector indication, the sequence corresponding to the first frequency domain DFT vector indication has a corresponding relationship with a value of the indication message.

Optionally, bit width of the indication message is log $$2 \left\lceil \frac{1}{N3} \sum_{d | \gcd(M, N3-M)} \varphi(d) \binom{N3/d}{M/d} \right\rceil,$$

where log is a logarithmic function.

Optionally, each bit in the indication message is used for indicating any bit in a sequence corresponding to the first frequency domain DFT vector indication except a default bit.

Particularly,

1. Selection cases of M columns are divided into several groups, and each group contains at most N3 cases, which satisfy a relationship that every two cases are cyclic shifts of each other;

A relationship of cyclic shift of binary sequence means that one sequence may be obtained by left (right) cyclic shifting of another sequence.

x0=00001111, x1=00011110, . . . , x7=10000111 belong to a cyclic shift relationship.

May be divided into $$\frac{1}{n} \sum_{d | \gcd(a, n-a)} \varphi(d) \binom{n/d}{a/d}$$

groups, each group has at most N sequences.

Selection result of M DFT vectors is reported

2. After selecting M columns, a UE finds a group reported by the UE and reports an indication, a network may know a group number at which the group is located through the indication.

a) As there are multiple sequences in each group, the UE may find its corresponding group through cyclic shift.

i. performing cyclic shifting n times on a sequence selected by UE, and taking a minimum value of the sequences.

ii, through an indication message whose bit width is $$\left\lceil \log 2 \left( \frac{1}{n} \sum_{d | \gcd(a, n-a)} \varphi(d) \binom{n/d}{a/d} \right) \right\rceil,$$

by predefining a corresponding relationship between the minimum value and the indication message, a value of the indication message is obtained and reported to the base station.

iii. It may be indicated by a message whose bit width is a combinatorial number of ⌈log 2(nchoosek(N3−x,M−y))⌉, herein "nchoosek" indicates selecting k combinatorial numbers from n sequences, N3 is the number of columns of the DFT array, M is the number of DFT vectors selected by UE, and N3, M, n, k, x, y are positive integers. What is corresponded here is information except a highest bit and a lowest bit. The base station determines a final value by combining default values of the highest bit and lowest bit.

After receiving the group number, the base station may recover a downlink channel.

Implementation One

An existing Type II codebook is further decomposed. Considering influence of cyclic shift, the codebook may be decomposed into $$W = W_1 \hat{W}_2 W_f^H \, \text{diag}(x_d)$$

Herein, $$x_d = \begin{bmatrix} 1 & e^{-j\frac{2\pi d}{N}} & \cdots & e^{-j\frac{2\pi(N-1)d}{N}} \end{bmatrix}$$

is a DFT vector and d is used for indicating cyclic shift of a frequency domain.

Implementation Two

N3=8, M=4, then there are 70 kinds of selection cases in total, which may be divided into $$\frac{1}{n} \sum_{d \mid \gcd(a, n-a)} \varphi(d) \binom{n/d}{a/d} = 10$$

groups at the same time. Codebooks in each group have a cyclic shift relationship. Each case is represented by binary number (a highest bit corresponds to No. 0 basis) (1 indicates that there is a selection frequency basis at a position thereof). Codebooks with an equivalent relationship within each group are shown in Table 1.

TABLE 1

| Group number | | | | Select M in N3 | | | | |
|---|---|---|---|---|---|---|---|---|
| 0 | '00001111' | '00011110' | '00111100' | '01111000' | '10000111' | '11100001' | '11100001' | '11110000' |
| 1 | '00010111' | '00101110' | '01011100' | '01110001' | '10001011' | '10111000' | '11000101' | '11100010' |
| 2 | '00011011' | '00110110' | '01100011' | '01101100' | '10001101' | '10110001' | '11000110' | '11011000' |
| 3 | '00011101' | '00111010' | '01000111' | '01110100' | '10001110' | '10100011' | '11010001' | '11101000' |
| 4 | '00100111' | '00111001' | '01001110' | '01110010' | '10010011' | '10011100' | '11001001' | '11100100' |
| 5 | '00101011' | '01010110' | '01011001' | '01100101' | '10010101' | '10101100' | '10110010' | '11001010' |
| 6 | '00101101' | '01001011' | '01011010' | '01101001' | '10010110' | '10100101' | '10110100' | '11010010' |
| 7 | '00110011' | '01100110' | '10011001' | '11001100' | | | | |
| 8 | '00110101' | '01001101' | '01010011' | '01101010' | '10011010' | '10100110' | '10101001' | '11010100' |
| 9 | '01010101' | '10101010' | | | | | | |

When UE selects M columns, columns [3 5 6 7] are selected, as shown in FIG. 5. Then, when reporting, it is a third group that is found according to [00010111] (it may be indexed by a minimum value corresponding to a leading code word (00011101)), and a reporting indication is 3 (because the base station can recover a channel with any one in a third row). This implementation indicates a selection of DFT vectors using a bitmap for convenience of the description. However, if an implementation mode of combinatorial number is adopted, the operation process is consistent, only a binary sequence to correspond to the combinatorial number.

Considering computational complexity of calculating a corresponding relationship between a reporting indication and a group number, after 00011101 is obtained, only middle 6 bits may be encoded (the highest bit must be 0, and the lowest bit must be 1). That is, the message may be encoded through ⌈log 2(nchoosek(N3−x,M−y))⌉, and the base station may recover the message by filling 1 in a low bit after recovering the middle bits.

Implementation Three (Ignoring Codebooks with a Period Less than N3):

For N3=8, M=4, because GCD (N3,M)=[1 2 4], there is a repetition of sequences in a unit of 2 and a unit of 4 (i.e., group 7 and group 9), as shown in Table 2.

TABLE 2

| Group number | Select M in N3 | | | | | | | |
|---|---|---|---|---|---|---|---|---|
| 0 | '00001111' | '00011110' | '00111100' | '01111000' | '10000111' | '11000011' | '11100001' | '11110000' |
| 1 | '00010111' | '00101110' | '01011100' | '01110001' | '10001011' | '10111000' | '11000101' | '11100010' |
| 2 | '00011011' | '00110110' | '01100011' | '01101100' | '10001101' | '10110001' | '11000110' | '11011000' |
| 3 | '00011101' | '00111010' | '01000111' | '01110100' | '10001110' | '10100011' | '11010001' | '11101000' |
| 4 | '00100011' | '00111001' | '01001110' | '01110010' | '10010011' | '10011100' | '11001001' | '11100100' |
| 5 | '00101011' | '01010110' | '01011001' | '01100101' | '10010101' | '10101100' | '10110010' | '11001010' |
| 6 | '00101101' | '01001011' | '01011010' | '01101001' | '10010110' | '10100101' | '10110100' | '11010010' |
| 7 | '00110011' | '01100110' | '10011001' | '11001100' | | | | |
| 8 | '00110101' | '01001101' | '01010011' | '01101010' | '10011010' | '10100110' | '10101001' | '11010100' |
| 9 | '01010101' | '10101010' | | | | | | |

Herein, group 7 is repeated twice in the unit of 4 bits {0011, 0110, 1001, 1100}, group 9 is repeated four times in the unit of 2 bits {01, 10}.

In order to simplify implementation complexity, the network ignores codebooks of group 7 and group 9, that is, group numbers allowed to be reported by UE are shown in Table 3.

TABLE 3

| Group number | Select M in N3 | | | | | | | |
|---|---|---|---|---|---|---|---|---|
| 0 | '00001111' | '00011110' | '00111100' | '01111000' | '10000111' | '11000011' | '11100001' | '11110000' |
| 1 | '00010111' | '00101110' | '01011100' | '01110001' | '10001011' | '10111000' | '11000101' | '11100010' |
| 2 | '00011011' | '00110110' | '01100011' | '01101100' | '10001101' | '10110001' | '11000110' | '11011000' |
| 3 | '00011101' | '00111010' | '01000111' | '01110100' | '10001110' | '10100011' | '11010001' | '11101000' |
| 4 | '00100011' | '00111001' | '01001110' | '01110010' | '10010011' | '10011100' | '11001001' | '11100100' |
| 5 | '00101011' | '01010110' | '01011001' | '01100101' | '10010101' | '10101100' | '10110010' | '11001010' |
| 6 | '00101101' | '01001011' | '01011010' | '01101001' | '10010110' | '10100101' | '10110100' | '11010010' |
| 7 | '00110101' | '01101101' | '10010011' | '01101010' | '10011010' | '10100110' | '10101001' | '11010100' |

Implementation Four

For N3=13 and M=ceil (½*N3)=7, then N3 and M are mutually prime. A factor of GCD (N3, M) is only [1], and there is no repetition of sequences smaller than N3. The codebook may be completely divided into N3 groups to achieve best compression efficiency, as shown in Table 4.

TABLE 4

| Group number | Select M from N3 | | | | | |
|---|---|---|---|---|---|---|
| 0 | 0000001111111' | 0000011111110' | '0000111111100' | '0001111111000' | '0011111110000' | '1111111000000' |
| 1 | '0000010111111' | '0000101111110' | '0001011111100' | '0010111111000' | '0101111110000' | '1111110000010' |
| ... | | | | | | ... |
| 130 | '0011101010101' | '0100111010101' | '0101001110101' | '0101010011101' | '0101010100111' | '1110101010100' |
| 131 | '0101010101011' | '0101010101101' | '0101010110101' | '0101011010101' | '0101101010101' | '1101010101010' |

Implementation Five

The network side defines a candidate set of UE in a predefined way, as shown in Table 5.

TABLE 5

| Group number | Sequence |
|---|---|
| 0 | '1111111000000' |
| 1 | '1111110000010' |
| 2 | '1111100000010' |
| 3 | '1111000001110' |
| 4 | '1111011100000' |

TABLE 5-continued

| Group number | Sequence |
|---|---|
| 5 | '1111101100000' |
| 6 | '1111110100000' |

TABLE 5-continued

| Group number | Sequence |
|---|---|
| 7 | '1111110000100' |
| 8 | '1111100001010' |

TABLE 5-continued

| Group number | Sequence |
|---|---|
| 9 | '1111000010110' |
| 10 | '1110111000010' |
| 11 | '1111011000010' |
| 12 | '1111101000010' |
| 13 | '1111100001100' |
| 14 | '1111000011010' |
| 15 | '1110000110110' |
| 16 | '1110110000110' |
| 17 | '1111010000110' |
| 18 | '1111000011100' |

TABLE 5-continued

| Group number | Sequence |
|---|---|
| 19 | '1110101110000' |
| 20 | '1110110110000' |
| 21 | '1110111010000' |
| 22 | '1111001110000' |
| 23 | '1111010110000' |
| 24 | '1111011010000' |
| 25 | '1111100110000' |
| 26 | '1111101010000' |
| 27 | '1111110010000' |
| 28 | '1111110001000' |
| 29 | '1111100010010' |
| 30 | '1111000100110' |
| 31 | '1110111000100' |
| 32 | '1111011000100' |
| 33 | '1111101000100' |
| 34 | '1111100010100' |
| 35 | '1111000101010' |
| 36 | '1110001010110' |
| 37 | '1110110001010' |
| 38 | '1111010001010' |
| 39 | '1111000101100' |
| 40 | '1110001011010' |
| 41 | '1101101100010' |
| 42 | '1110100010110' |
| 43 | '1110011100010' |
| 44 | '1110101100010' |
| 45 | '1110110100010' |
| 46 | '1111001100010' |
| 47 | '1111010100010' |
| 48 | '1111100100010' |
| 49 | '1111100011000' |
| 50 | '1111000110010' |
| 51 | '1110001100110' |
| 52 | '1110110001100' |
| 53 | '1111010001100' |
| 54 | '1111000110100' |
| 55 | '1110001101010' |
| 56 | '1101100011010' |
| 57 | '1110100011010' |
| 58 | '1110001101100' |
| 59 | '1101101011000' |
| 60 | '1101101101000' |
| 61 | '1110001000110' |
| 62 | '1110101000110' |
| 63 | '1111001000110' |
| 64 | '1111000111000' |
| 65 | '1110010111000' |
| 66 | '1110011011000' |
| 67 | '1110100011100' |
| 68 | '1110100111000' |
| 69 | '1110101011000' |
| 70 | '1110101101000' |
| 71 | '1110110011000' |
| 72 | '1110110101000' |
| 73 | '1110111001000' |
| 74 | '1111001011000' |
| 75 | '1111001101000' |
| 76 | '1111010011000' |
| 77 | '1111010101000' |
| 78 | '1111011001000' |
| 79 | '1111100101000' |
| 80 | '1111101001000' |
| 81 | '1111100100100' |
| 82 | '1111100101010' |
| 83 | '1110010010110' |
| 84 | '1110010010010' |
| 85 | '1111010010010' |
| 86 | '1110100001100' |
| 87 | '1110010011010' |
| 88 | '1101101100100' |
| 89 | '1110100100110' |
| 90 | '1110011100100' |
| 91 | '1110101100100' |
| 92 | '1110110100100' |
| 93 | '1111001100100' |
| 94 | '1111010100100' |
| 95 | '1111001010010' |
| 96 | '1110010100110' |
| 97 | '1110110010100' |
| 98 | '1111010010100' |
| 99 | '1111001010100' |
| 100 | '1110010101010' |
| 101 | '1101100101010' |
| 102 | '1110100101010' |
| 103 | '1110010101100' |
| 104 | '1101011001100' |
| 105 | '1101101001010' |
| 106 | '1110011001010' |
| 107 | '1110101001010' |
| 108 | '1110010110010' |
| 109 | '1101100101100' |
| 110 | '1110100101100' |
| 111 | '1110010110100' |
| 112 | '1101010110010' |
| 113 | '1101011010010' |
| 114 | '1101100110010' |
| 115 | '1101101010010' |
| 116 | '1110011010010' |
| 117 | '1110100110010' |
| 118 | '1110101010010' |
| 119 | '1110011001100' |
| 120 | '1101011001100' |
| 121 | '1101101001100' |
| 122 | '1110101001100' |
| 123 | '1101100110100' |
| 124 | '1110100110100' |
| 125 | '1110011010100' |
| 126 | '1101010101100' |
| 127 | '1101010110100' |
| 128 | '1101011010100' |
| 129 | '1101101010100' |
| 130 | '1110101010100' |
| 131 | '1101010101010' |

Difference from the previous implementations is that the implementation also has a mapping relationship between a sequence bitmap and a physical DFT vector:

1. Sequence mapping (from a high bit to a low bit) corresponds to DFT [0, 2pi], as shown in FIG. 6.

2. Sequence mapping (from a high bit to a low bit) corresponds to DFT from a low frequency to a high frequency, as shown in FIG. 7.

The network may guarantee higher feedback accuracy of CSI at a low frequency with mode 1 or mode 2.

The UE selects a best codebook from a restricted set (in the implementation, a selection is from 132 codebooks. If there is no restriction, there are 1716 candidate codebooks), and feeds back to the base station.

Figures 8, 9:
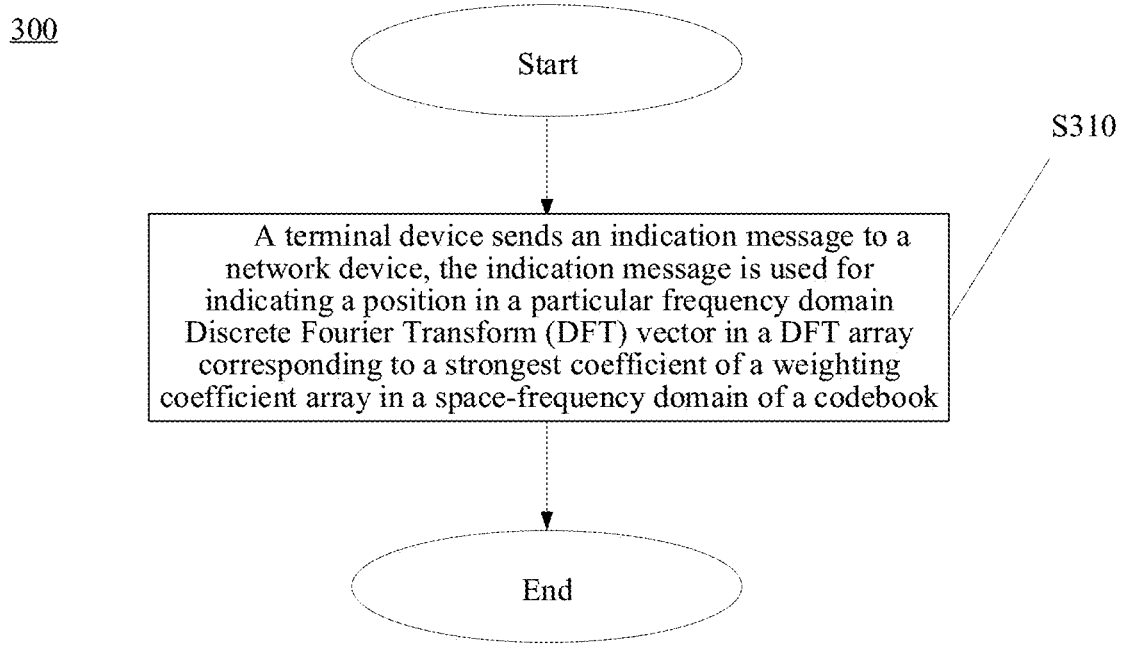
FIG. 8 is another schematic diagram of a codebook feedback method according to an implementation of the present disclosure.
FIG. 9 is a schematic diagram of a DFT vector position corresponding to a strongest coefficient according to an implementation of the present disclosure.

FIG. 8 shows a schematic block diagram of a codebook feedback method 300 according to an implementation of the present disclosure. As shown in FIG. 8, the method 300 may be executed by a terminal device, and the method 300 includes some or all of the following contents:

S310, the terminal device sends an indication message to a network device, wherein the indication message is used for indicating a position in a particular frequency domain Discrete Fourier Transform (DFT) vector in a DFT array corresponding to a strongest coefficient of a weighting coefficient array in a space-frequency domain of a codebook.

Optionally, bit width of the indication message is log 2(2*L), herein 2*L is a number of rows in a space-frequency domain matrix.

Optionally, the bit width of the indication message is ⌈log 2(Lnz)⌉, herein Lnz is a number of rows occupied by non-zero coefficients in the space-frequency domain matrix.

Optionally, the method further includes that the terminal device performs a cyclic shift operation on frequency domain DFT vectors corresponding to the non-zero coefficient in the space-frequency domain matrix such that the strongest coefficient corresponds to a particular frequency domain DFT vector in the DFT array.

Optionally, the particular frequency domain DFT vector is the first frequency domain DFT vector or a last frequency domain DFT vector in the DFT array.

Particularly,

1. UE needs to report Knz<=K0 positions in W2, which may be reported by a message whose length is ⌈log 2(Knz)⌉. In this scheme, because an absolute position of the frequency domain has no effect on performance, the frequency domain position where the strongest coefficient is located is moved to a fixed position (for example, 0) through a cyclic shift of the UE. Then:

a) the strongest coefficient must appear at a fixed position (such as 0)

b) the position of the strongest coefficient only needs to be indicated by ⌈log 2(2L)⌉ bits or ⌈log 2(Lnz)⌉ or a bitmap of Lnz bits.

i. herein, 2L represents all 2L space bases

Lnz represents a number of space bases corresponding to non-zero elements only in space.

Implementation Seven

The efficiency of indicating the strongest coefficient is enhanced. As shown in FIG. 9, the conventional scheme is on the left. UE indicates Knz=12 non-zero coefficients through a bitmap of 2LM, and then determines a position of the strongest coefficient with 4 bits by means of a combinatorial number according to that the strongest coefficient appears at a 5th position (red). In the scheme on the right, based on the left, a selection of M DFT vectors [3 4 5 6 7] is cyclic shifted to [0 1 2 6 7], and then only 2 bits (within a 0th DFT vector) are needed to indicate a number of rows of the strongest coefficient (log 2(2L)).

Or a scheme of FIG. 10 may be adopted. When the UE indicates the strongest coefficient, it may be found that there are non-zero coefficients on rows [0 1 4 5]. So that the strongest coefficient is on a fourth space basis may be indicated by 4 bits [0 0 1 0].

FIG. 11 shows a schematic block diagram of a codebook feedback method 400 according to an implementation of the present disclosure. As shown in FIG. 11, the method 400 may be executed by a network device, and the method 400 includes some or all of the following contents:

S410, a network device receives an indication message sent by a terminal device, the indication message is used for indicating a first frequency domain Discrete Fourier Transform DFT vector indication set in multiple frequency domain DFT vector indication sets.

S420, the network device recovers a downlink channel according to any one frequency domain DFT vector indication equivalent to a first frequency domain DFT vector indication in the first frequency domain DFT vector indication set.

Optionally, the first frequency domain DFT vector indication set does not include a second frequency domain DFT vector indication, wherein a sequence corresponding to the second frequency domain DFT vector indication has a cyclic shift relationship with a sequence corresponding to the first frequency domain DFT vector indication. Or the first frequency domain DFT vector indication set includes multiple frequency domain DFT vector indications, and sequences corresponding to any two frequency domain DFT vector indications in the multiple frequency domain DFT vector indications have a cyclic shift relationship.

Figure 12:
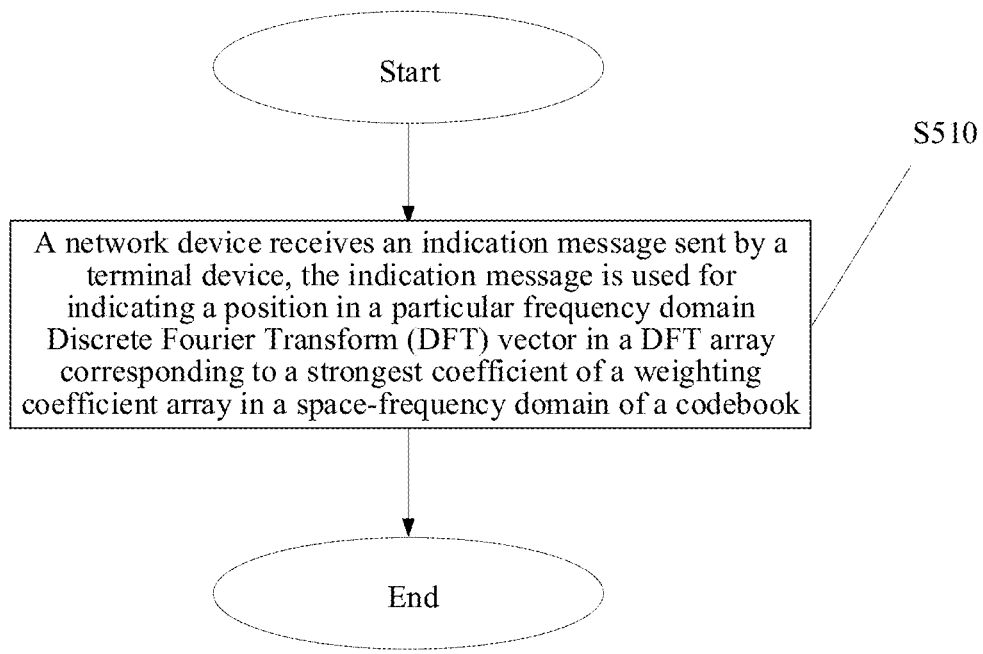
FIG. 12 is another schematic diagram of a codebook feedback method according to an implementation of the present disclosure.

FIG. 12 shows a schematic block diagram of a codebook feedback method 500 according to an implementation of the present disclosure. As shown in FIG. 12, the method 500 may be executed by a network device, and the method 500 includes some or all of the following contents:

S510, a network device receives an indication message sent by a terminal device, wherein the indication message is used for indicating a position in a particular frequency domain Discrete Fourier Transform (DFT) vector in a DFT array corresponding to a strongest coefficient of a weighting coefficient array in a space-frequency domain of a codebook.

It should be understood that the interaction between the network device and the terminal device, related characteristics, and functions, etc. described at the network side correspond to related characteristics and functions of the terminal device. Moreover, the related contents have been described in detail in the above methods 200 and 300, which are not repeated here for the sake of brevity.

It should also be understood that sequence numbers of the foregoing processes do not mean execution sequences in various implementations of the present disclosure. The execution sequences of the processes should be determined according to functions and internal logic of the processes, and should not constitute any limitation on the implementation processes of the implementations of the present disclosure.

The codebook feedback method according to the implementations of the present invention have been described in detail above, and the codebook feedback device according to implementations of the present disclosure will be described below with reference to FIG. 13 to FIG. 16. The technical features described in the method implementations are applicable to following device implementations.

Figure 13:
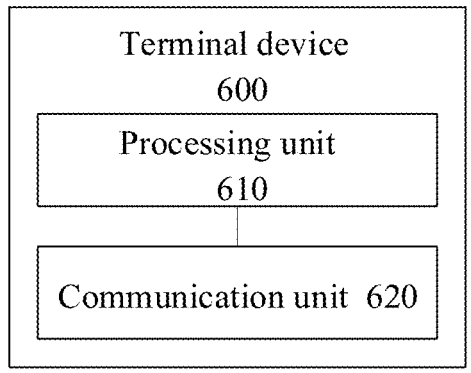
FIG. 13 is a schematic block diagram of a terminal device according to an implementation of the present disclosure.

FIG. 13 shows a schematic block diagram of a terminal device 600 according to an implementation of the present disclosure. As shown in FIG. 13, the terminal device 600 includes:

a processing unit 610, configured to select M frequency domain Discrete Fourier Transform (DFT) vectors from a DFT array, and determine a first frequency domain DFT vector indication set from multiple frequency domain DFT vector indication sets according to the M frequency domain DFT vectors, wherein an indication of the M frequency domain DFT vectors is equivalent to a first frequency domain DFT vector indication in the first frequency domain DFT vector indication set, and M is a positive integer; and a communication unit 620, configured to send an indication message to a network device, wherein the indication message is used for indicating the first frequency domain DFT vector indication set.

It should be understood that the terminal device 600 according to the implementation of the present disclosure may correspond to the terminal device in the method implementation of the present disclosure, and the above-mentioned and other operations and/or functions of various units in the terminal device 600 are respectively for implementing the corresponding processes of the terminal device in the method shown in FIG. 4, which are not repeated here for brevity.

Figure 14:
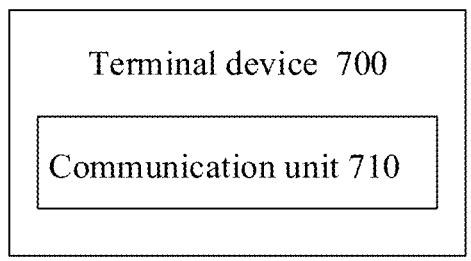
FIG. 14 is a schematic block diagram of a terminal device according to an implementation of the present disclosure.

FIG. 14 shows a schematic block diagram of a terminal device 700 according to an implementation of the present disclosure. As shown in FIG. 14, the terminal device 700 includes:

a communication unit 710, configured to send an indication message to a network device, wherein the indication message is used for indicating a position in a particular frequency domain Discrete Fourier Transform (DFT) vector in a DFT array corresponding to a strongest coefficient of a weighting coefficient array in a space-frequency domain of a codebook.

It should be understood that the terminal device 700 according to the implementation of the present disclosure may correspond to the terminal device in the method implementation of the present disclosure, and the above-mentioned and other operations and/or functions of various units in the terminal device 700 are respectively for implementing the corresponding processes of the terminal device in the method shown in FIG. 8, which are not repeated here for brevity.

Figure 15:
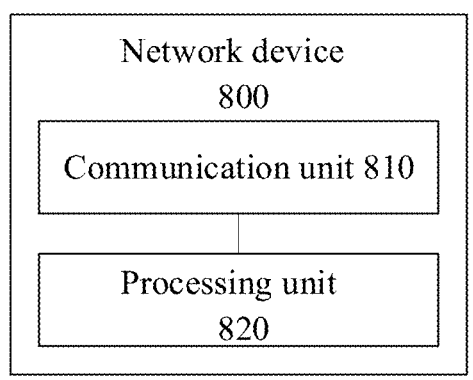
FIG. 15 is a schematic block diagram of a network device according to an implementation of the present disclosure.

FIG. 15 is a schematic block diagram of a network device 800 according to an implementation of the present disclosure. As shown in FIG. 15, the network device 800 includes:

a communication unit 810, configured to receive an indication message sent by a terminal device, wherein the indication message is used for indicating a first frequency domain Discrete Fourier Transform (DFT) vector indication set in multiple frequency domain DFT vector indication sets; and a processing unit 820, configured to recover a downlink channel according to any one frequency domain DFT vector indication equivalent to a first frequency domain DFT vector indication in the first frequency domain DFT vector indication set.

It should be understood that the network device 800 according to the implementation of the present disclosure may correspond to the network device in the method implementations of the present disclosure, and the above-mentioned and other operations and/or functions of various units in the device 800 are respectively for implementing the corresponding processes of the network device in the method shown in FIG. 11, which are not repeated here for the sake of brevity.

Figure 16:
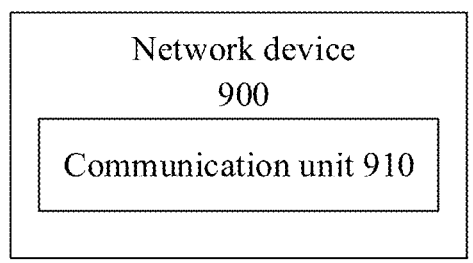
FIG. 16 is a schematic block diagram of a network device according to an implementation of the present disclosure.

FIG. 16 is a schematic block diagram of a network device 900 according to an implementation of the present disclosure. As shown in FIG. 16, the network device 900 includes:

a communication unit 910, configured to receive an indication message sent by a terminal device, wherein the indication message is used for indicating a position in a particular frequency domain Discrete Fourier Transform (DFT) vector in a DFT array corresponding to a strongest coefficient of a weighting coefficient array in a space-frequency domain of a codebook.

It should be understood that the network device 900 according to the implementation of the present disclosure may correspond to the network device in the method implementations of the present disclosure, and the above-mentioned and other operations and/or functions of various units in the device 900 are respectively for implementing the corresponding processes of the network device in the method shown in FIG. 12, which are not repeated here for the sake of brevity.

It should be understood that the processor in the implementations of the present disclosure may be an integrated circuit chip having a signal processing capability. In an implementation process, the steps of the foregoing method implementations may be implemented through an integrated logic circuit of hardware in the processor or instructions in a form of software. The processor described above may be a general purpose processor, a digital signal processor (DSP), an application specific integrated circuit (ASIC), a field programmable gate array (FPGA) or other programmable logic device, a discrete gate or a transistor logic device, or a discrete hardware component. The processor may implement or perform various methods, steps and logical block diagrams disclosed in the implementations of the present disclosure. The general purpose processor may be a microprocessor, or the processor may also be any conventional processor, or the like. The steps of the methods disclosed in combination with the implementations of the present disclosure may be directly embodied to be implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, or a register. The storage medium is located in the memory, and the processor reads information in the memory and performs the steps of the foregoing methods in combination with its hardware.

It may be understood that the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through illustrative but not restrictive description, various forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but not be limited to, these and any other suitable types of memories.

It should be understood that the foregoing memory is described in an exemplary but non-limiting sense. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present disclosure is intended to include, but not be limited to, these and any other suitable types of memories.

An implementation of the present disclosure further provides a computer readable storage medium configured to store a computer program.

Optionally, the computer readable storage medium may be applied in a network device of the implementations of the present disclosure, and when the computer program is run on a computer, the computer is enabled to perform the corresponding processes implemented by the network device in various methods of the implementations of the present disclosure, which are not repeated here for brevity.

Optionally, the computer readable storage medium may be applied in a terminal device of the implementations of the present disclosure, and when the computer program is run on a computer, the computer is enabled to perform the corresponding processes implemented by a mobile terminal/terminal device in various methods of implementations of the present disclosure, which are not repeated here for brevity.

An implementation of the present disclosure further provides a computer program product including computer program instructions.

Optionally, the computer program product may be applied in a network device of the implementations of the present disclosure, and when the computer program instructions are executed by a computer, the computer is enabled to perform the corresponding processes implemented by the network device in various methods of the implementations of the present disclosure, which are not repeated here for brevity.

Optionally, the computer program product may be applied in a terminal device of implementations of the present disclosure, and when the computer program instructions are executed by a computer, the computer is enabled to perform corresponding processes implemented by the mobile terminal/terminal device in various methods of implementations of the present disclosure, which are not repeated here for brevity.

An implementation of the present disclosure further provides a computer program.

Optionally, the computer program may be applied in a network device of the implementations of the present disclosure. When the computer program is run on a computer, the computer is enabled to perform the corresponding processes implemented by the network device in various methods of the implementations of the present disclosure, which are not repeated here for brevity.

Optionally, the computer program may be applied in a terminal device of implementations of the present disclosure. When the computer program is run on a computer, the computer is enabled to perform corresponding processes implemented by the terminal device in various methods of implementations of the present disclosure, which are not repeated here for brevity.

A person of ordinary skill in the art may recognize that the elements and algorithm steps in various examples described in combination with the implementations disclosed herein may be implemented in electronic hardware, or a combination of computer software and electronic hardware. Whether these functions are implemented in hardware or software depends on a specific application and design constraints of the technical scheme. Skilled artisans may use various methods to implement the described functions for each particular application, but such implementation should not be considered to be beyond the scope of the present disclosure.

Those skilled in the art may clearly understand that for the sake of convenience and conciseness of description, the specific working processes of the systems, devices and units described above may be described with reference to the corresponding processes in the above method implementations, which are not repeated herein.

In several implementations provided by the present disclosure, it should be understood that the disclosed systems, devices and methods may be implemented in other ways. For example, the device implementations described above are only illustrative, for example, the division of the units is only a logical function division, and there may be other division modes in actual implementation. For example, multiple units or components may be combined or integrated into another system, or some features may be ignored or not executed. On the other hand, the displayed or discussed coupling or direct coupling or communication connection between each other may be an indirect coupling or communication connection through some interfaces, devices or units, which may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

When the functions are implemented in a form of software functional unit and sold or used as an independent product, the software functional units may be stored in a computer readable storage medium. Based on such understanding, the technical solution of the present disclosure, in essence, or the part contributing to the prior art, or the part of the technical solution, may be embodied in the form of a software product. The computer software product is stored in a storage medium, and includes several instructions for instructing a computer device (which may be a personal computer, a server, or a network device, etc.) to perform all or part of the steps of various implementations of the present disclosure. The aforementioned storage medium may include any medium that can store program codes, such as a USB flash disk, a mobile hard disk, a read-only memory (ROM), a random access memory (RAM), a magnetic disk, or an optical disk.

What are described above are merely example implementations of the present disclosure, but the protection scope of the present disclosure is not limited thereto. Any variation or substitution that may readily conceived by a person skilled in the art within the technical scope disclosed by the present disclosure shall fall within the protection scope of the present disclosure. Therefore, the protection scope of the present disclosure shall be subject to the protection scope of the claims.

What we claim is:

1. A codebook feedback method, comprising:
selecting, by a terminal device, M frequency domain Discrete Fourier Transform (DFT) vectors from a DFT array;
determining, by the terminal device, a first frequency domain DFT vector indication set from a plurality of frequency domain DFT vector indication sets according to the M frequency domain DFT vectors, wherein an indication of the M frequency domain DFT vectors is equivalent to a first frequency domain DFT vector indication in the first frequency domain DFT vector indication set, and M is a positive integer; and
sending, by the terminal device, an indication message to a network device, wherein the indication message is used for indicating the first frequency domain DFT vector indication set.

2. The method of claim 1, wherein the indication of the M frequency domain DFT vectors is equivalent to the first frequency domain DFT vector indication in the first frequency domain DFT vector indication set comprises:
a sequence corresponding to the indication of the M frequency domain DFT vectors is different from a sequence corresponding to the first frequency domain DFT vector indication, and the sequence corresponding to the indication of the M frequency domain DFT vectors has a cyclic shift relationship with the sequence corresponding to the first frequency domain DFT vector indication; or the first frequency domain DFT vector indication set comprises a plurality of frequency domain DFT vector indications, wherein sequences corresponding to any two frequency domain DFT vectors in the plurality of frequency domain DFT vector indications have a cyclic shift relationship, and the first frequency domain DFT vector indication set comprises the indication of the M frequency domain DFT vectors.

3. The method of claim 1, wherein each bit in the indication message is used for indicating any one bit in a sequence corresponding to the first frequency domain DFT vector indication except a default bit.

4. The method of claim 2, wherein each bit in the indication message is used for indicating any one bit in the sequence corresponding to the first frequency domain DFT vector indication except a default bit.

5. The method of claim 3, wherein bit width of the indication message is $\lceil \log 2(\text{nchoosek}(N3-x,M-y)) \rceil$, wherein N3 is a number of columns of the DFT array, and N3, n, k, x, y are positive integers, and wherein nchoosek indicates selecting k combinatorial numbers from n sequences.

6. The method of claim 4, wherein bit width of the indication message is $\lceil \log 2(\text{nchoosek}(N3-x,M-y)) \rceil$, wherein N3 is a number of columns of the DFT array, and N3, n, k, x, y are positive integers, and wherein nchoosek indicates selecting k combinatorial numbers from n sequences.

7. A codebook feedback method, comprising:
receiving, by a network device, an indication message sent by a terminal device, wherein the indication message is used for indicating a first frequency domain Discrete Fourier Transform (DFT) vector indication set in a plurality of frequency domain DFT vector indication sets; and
recovering, by the network device, a downlink channel according to any one frequency domain DFT vector indication equivalent to a first frequency domain DFT vector indication in the first frequency domain DFT vector indication set.

8. The method of claim 7, wherein the first frequency domain DFT vector indication set does not comprise a second frequency domain DFT vector indication, and a sequence corresponding to the second frequency domain DFT vector indication has a cyclic shift relationship with a sequence corresponding to the first frequency domain DFT vector indication; or the first frequency domain DFT vector indication set comprises a plurality of frequency domain DFT vector indications, and sequences corresponding to any two frequency domain DFT vector indications in the plurality of frequency domain DFT vector indications have a cyclic shift relationship.

9. The method of claim 7, wherein each bit in the indication message is used for indicating any one bit in a sequence corresponding to the first frequency domain DFT vector indication except a default bit.

10. The method of claim 8, wherein each bit in the indication message is used for indicating any one bit in the sequence corresponding to the first frequency domain DFT vector indication except a default bit.

11. The method of claim 9, wherein bit width of the indication message is $\lceil \log 2(\text{nchoosek}(N3-x,M-y)) \rceil$, wherein N3 is a number of columns of a DFT array, M is a number of DFT vectors selected by the terminal device, and N3, M, n, k, x, y are positive integers, and wherein nchoosek indicates selecting k combinatorial numbers from n sequences.

12. The method of claim 10, wherein bit width of the indication message is $\lceil \log 2(\text{nchoosek}(N3-x,M-y)) \rceil$, wherein N3 is a number of columns of a DFT array, M is a number of DFT vectors selected by the terminal device, and N3, M, n, k, x, y are positive integers, and wherein nchoosek indicates selecting k combinatorial numbers from n sequences.

13. A terminal device, comprising a processor and a transceiver, wherein
the processor is configured to select M frequency domain discrete Fourier transform (DFT) vectors from a DFT array, and determine a first frequency domain DFT vector indication set from a plurality of frequency domain DFT vector indication sets according to the M frequency domain DFT vectors, wherein an indication of the M frequency domain DFT vectors is equivalent to a first frequency domain DFT vector indication in the first frequency domain DFT vector indication set, and M is a positive integer; and
the transceiver is configured to send an indication message to a network device, wherein the indication message is used for indicating the first frequency domain DFT vector indication set.

14. The terminal device of claim 13, wherein the indication of the M frequency domain DFT vectors is equivalent to the first frequency domain DFT vector indication in the first frequency domain DFT vector indication set comprises:
a sequence corresponding to the indication of the M frequency domain DFT vectors is different from a sequence corresponding to the first frequency domain DFT vector indication, and the sequence corresponding to the indication of the M frequency domain DFT vectors has a cyclic shift relationship with the sequence corresponding to the first frequency domain DFT vector indication; or
the first frequency domain DFT vector indication set comprises a plurality of frequency domain DFT vector indications, wherein sequences corresponding to any two frequency domain DFT vectors in the plurality of frequency domain DFT vector indications have a cyclic shift relationship, and the first frequency domain DFT vector indication set comprises the indication of the M frequency domain DFT vectors.

15. The terminal device of claim 13, wherein each bit in the indication message is used for indicating any one bit in a sequence corresponding to the first frequency domain DFT vector indication except a default bit.

16. The terminal device of claim 14, wherein each bit in the indication message is used for indicating any one bit in the sequence corresponding to the first frequency domain DFT vector indication except a default bit.

17. The terminal device of claim 13, wherein bit width of the indication message is $\lceil \log 2(\text{nchoosek}(N3-x,M-y)) \rceil$, wherein N3 is a number of columns of the DFT array, and N3, n, k, x, y are positive integers, and wherein nchoosek indicates selecting k combinatorial numbers from n sequences.

18. The terminal device of claim 14, wherein bit width of the indication message is $\lceil \log 2(\text{nchoosek}(N3-x,M-y)) \rceil$, wherein N3 is a number of columns of the DFT array, and N3, n, k, x, y are positive integers, and wherein nchoosek indicates selecting k combinatorial numbers from n sequences.

19. A network device, comprising a transceiver and a processor, wherein the transceiver is configured to receive indication message sent by a terminal device, wherein the indication message is used for indicating a first frequency domain Discrete Fourier Transform (DFT) vector indication set in a plurality of frequency domain DFT vector indication sets; and the processor is configured to recover a downlink channel according to any one frequency domain DFT vector indication equivalent to a first frequency domain DFT vector indication in the first frequency domain DFT vector indication set.

20. The network device of claim 19, the first frequency domain DFT vector indication set does not comprise a second frequency domain DFT vector indication, and a sequence corresponding to the second frequency domain DFT vector indication has a cyclic shift relationship with a sequence corresponding to the first frequency domain DFT vector indication; or the first frequency domain DFT vector indication set comprises a plurality of frequency domain DFT vector indications, and sequences corresponding to any two frequency domain DFT vector indications in the plurality of frequency domain DFT vector indications have a cyclic shift relationship.

21. The network device of claim 19, wherein each bit in the indication message is used for indicating any one bit in a sequence corresponding to the first frequency domain DFT vector indication except a default bit.

22. The network device of claim 20, wherein each bit in the indication message is used for indicating any one bit in the sequence corresponding to the first frequency domain DFT vector indication except a default bit.

23. The network device of claim 21, wherein bit width of the indication message is $\lceil \log 2(\text{nchoosek}(N3-x,M-y)) \rceil$, wherein N3 is a number of columns of a DFT array, M is a number of DFT vectors selected by the terminal device, and N3, M, n, k, x, y are positive integers, and wherein nchoosek indicates selecting k combinatorial numbers from n sequences.

24. The network device of claim 22, wherein bit width of the indication message is $\lceil \log 2(\text{nchoosek}(N3-x,M-y)) \rceil$, wherein N3 is a number of columns of a DFT array, M is a number of DFT vectors selected by the terminal device, and N3, M, n, k, x, y are positive integers, and wherein nchoosek indicates selecting k combinatorial numbers from n sequences.

* * * * *